UNITED STATES PATENT OFFICE.

HOWARD W. MATHESON, OF MONTREAL, QUEBEC, CANADA.

PROCESS OF MANUFACTURING ACETALDEHYDE.

15,434. Specification of Reissued Letters Patent. Reissued Aug. 22, 1922.

No Drawing. Original No. 1,384,842, dated July 19, 1921, Serial No. 204,008, filed November 26, 1917. Application for reissue filed May 5, 1922. Serial No. 558,814.

*To all whom it may concern:*

Be it known that I, HOWARD W. MATHESON, a subject of the King of Great Britain, and resident of the city of Montreal, in the Province of Quebec, and Dominion of Canada, have invented certain new and useful Improvements in Processes of Manufacturing Acetaldehyde, of which the following is a full, clear, and exact description.

This invention relates to improvements in process of manufacturing acetaldehyde, and one object of the invention is to provide for the production of aldehyde in a continuous manner.

Another object is to provide for the manufacture of aldehyde in a safe, easy and commercially economical and practical manner.

A further object is to provide for the commercial manufacture of aldehyde in such manner that the formation of aldehyde resin and condensation products of aldehyde is entirely avoided.

A still further object is to provide for the carrying out of the process in such manner that only a small amount of catalyst is required.

Up to the present time, a considerable number of patents have been secured purporting to disclose methods for the manufacture of aldehyde. It has been found, however, that for the most part these patents disclose processes which are faulty from a commercial point of view. The processes as disclosed in these patents can be admirably carried out under laboratory conditions where only small amounts of aldehyde are produced. In carrying out the manufacture commercially, many conditions arise which do not exist in the laboratory, and therefore very considerable deviation is necessary from the disclosure of the existing patents, in order to arrive at a commercially practical and economical method of manufacture. Moreover, such patents when critically examined are found to disclose only "batch" or discontinuous processes.

There has been propounded as a species of axiom the theory that when using as a catalyst acids containing mercury salts, the concentration of the acid and the working temperature must be varied inversely, that is to say, if a highly concentrated acid is used, the working temperature must be low, and if a greatly dilute acid is used, the working temperature must be high. It has also been stated that the use of dilute acid is disadvantageous, because of the rapid reduction of the mercury salts to the metallic mercury.

According to this invention, it has been found that the manufacture of acetaldehyde can be commercially carried out with great ease, safety and efficiency by using as catalyst a dilute acid containing mercury salts and working at comparatively low temperatures, and at pressures as little above atmospheric as possible. Under these conditions, the formation of aldehyde resin and other undesirable products is for all practical purposes completely avoided, and at the same time, the apparatus is not attacked by the acid, and the mercury is resolved only very slowly to metallic mercury. Furthermore, the metallic mercury settles readily to the bottom of the reaction vessel, where it may be drawn off from time to time, and does not remain in fine particles in suspension throughout the liquid. It has also been found that the production of acetaldehyde may be carried on in a continuous manner, if the components of the reaction are replaced as they become used or useless, so as to preserve proper proportions, and that this continuity is not dependent on the acid strength, catalyst, temperature or pressure.

In carrying out the process according to this invention, the reaction vessel is charged with a quantity of dilute acid containing a small amount of mercury salt and acetylene passed through in quantity greatly in excess of what can be combined to form aldehyde. The temperature rises, but is controlled and kept within the desired limits, partially by the introduction of water which is carried over by the gas. The major portion, however, of the heat of reaction is removed by external cooling. The reaction liquid is vigorously and continuously stirred. The large outflow of acetylene entrains with it the aldehyde formed. This aldehyde is separated as completely as possible from the acetylene by passing the gases through condensers, and finally through a water scrubber. The acetylene thus cleaned of aldehyde may be returned to the reaction vessel, the precautions being taken to maintain an approximately uniform pressure in order that the supply of gas may be regular. The outlet of the reaction vessel preferably is sufficiently large for the gas to have free exit, so that the only pressure is that incident to back pressure of the scrubber. The aldehyde from the condensers and the scrubber water are collected and suitably refined. The process thus outlined may be carried on continuously. Tests of the reaction liquid are made at stated intervals, and water, acid or mercury salt added as required to maintain the catalyst uniform throughout the process. It is of course necessary from time to time to cleanse the reaction vessel. The catalyst deteriorates or becomes less active in course of time by reason of accumulations of metallic mercury and of complex mercury-sulphur and mercury-phosphorous organic compounds, the presence of which is due in part to impurities in commercial acetylene. These impurities are drawn off from time to time as sludge by settling, and under ordinary circumstances returned to the reaction vessel. The sludge or solid matter remaining is treated to recover the mercury which is then transformed into the desired salt and reintroduced into the reaction vessel.

The process in greater detail in so far as the reaction is concerned is as follows:—In a suitable vessel, preferable of high silicon iron having a mechanical stirring device, approximately one thousand gallons of 6% dilute sulphuric acid is introduced as an initial charge, together with approximately twenty-five pounds of neutralized or slightly acidulated mercuric oxide. Commercial acetylene gas is passed through the reaction liquid greatly in excess of the amount which can possibly be combined to form aldehyde, for example, at the rate of approximately sixty cubic feet per minute. The major portion of the heat of reaction is removed by external cooling. The temperature is preferably maintained between 60° and 65° C. which is well below the temperature of ebullition.

The continuity of the particular or any similar process is preserved by testing the reaction liquor at frequent intervals and adding water, acid or mercuric salt or both, as may be required to maintain the catalyst normal. The outflow of excess acetylene from the apparatus is unrestricted, so that the pressure remains very low and amounts at most to only two pounds, which is incident to the back pressure of the scrubber, as previously stated. The temperature, flow of gas and condition of the catalyst are maintained as nearly uniform as possible, and the aldehyde forms at a rate which may be considered remarkably rapid, in view of former disclosures. Owing to the temperature of the process, the aldehyde is formed in vaporous condition and is entrained by the excess acetylene and carried out of the reaction vessel immediately. The mixed gases pass through a plurality of condensers and a scrubber, which are arranged in series and which for all practical purposes completely remove the aldehyde from the acetylene. It has been found satisfactory to use first a cold water condenser, and second a brine condenser, having a temperature of −10° to −15° C. The first condenser cools the escaping gases and removes a small portion of the same. The remaining aldehyde is largely absorbed by the cold water in the scrubber.

The acetylene is then returned to the supply of the reaction vessel by any suitable apparatus, such as a blower, and in order to render the return of acetylene uniform, a gasometer may be arranged in parallel with the blower, so that acetylene coming from the scrubber in excess of the capacity of the blower will be received in the gasometer, while if the amount of gas issuing from the scrubber is below the capacity of the blower, the previous surplus of gas will be drawn from the gasometer.

Owing partly to the comparatively low temperature maintained in the reaction vessel and the dilution of the acid, and partly to the material of the vessel, it is not attacked to any appreciable extent by the acid, and therefore two essential requirements are met with, namely, the preservation of the vessel and the preservation of the catalyst. Contrary to the opinion expressed in previous patents, the mercuric oxide is not rapidly decomposed in the weak acid solution. Decomposition of the mercuric oxide, it is true, does occur, but only very slowly, and in such manner that the mercury liberated in metallic state largely collects in the bottom of the vessel and does not remain in suspension in the liquid nor interfere with the reaction. A certain further amount of the mercuric oxide is rendered ineffective by the combination with sulphur and phosphorus forming complex organic compounds, and for this reason, it is necessary to clean these out of the reaction vessel from time to time, in order to eliminate the foreign matter. The acid solution is separated from the solid matter by settling, and is then siphoned off and usually returned to the reaction vessel. As it is obviously impossible to separate any finely divided mercury from the mercury-sulphur and mercury-phosphorus organic compounds, it is necessary to treat the whole mass in order to recover the mercury in metallic state. The mercury thus recovered is treated preferably by electrolytic means to produce mercuric oxide. The oxide when formed is usually alkaline and is neutralized or slightly acidulated, before being introduced into the reaction vessel. The loss of sulphuric acid, mercury and acetylene in carrying out the process as above described is very small, and the amount of aldehyde produced is almost the theoretical amount. The aldehyde collected from the condensers together with the scrubber water is refined by distillation, and the final vapor or gas issuing from the still passed through a scrubber, which will collect any aldehyde not previously condensed and separate from it traces of acetylene which may have passed through the still in solution in the aldehyde. This scrubber water is collected with the output of the aldehyde condensers and scrubber in order that none may be lost, while the acetylene may also be returned to the supply for use in the reaction vessel.

From the foregoing description, it will be seen that the process is continuous in every respect and may be carried out easily and conveniently on a commercial scale. There is practically no loss of the catalyst or of the acetylene, and the apparatus remains undamaged even at the end of considerable periods of time. The large excess of acetylene carries the aldehyde out of the reaction liquid as soon as it is formed, so that it does not remain in contact with the acid a sufficient length of time, nor is it subjected to a sufficiently high temperature to form aldehyde resin or crotonaldehyde or other undesirable products. The yield of aldehyde is large, equalling almost the theoretical amount, and is produced very rapidly.

While the foregoing description has been given in considerable detail, it must be understood that this is by way of example, and that the invention is therefore not limited to the particular details set forth, as variation within reasonable limits of these details may be made from time to time to adjust the process to various conditions. It may be stated in particular that the process is not limited to the use of sulphuric acid or mercuric oxide, as other acids such as phosphoric may be used, as well as other materials than mercuric oxide, for example—mercurous oxide, or one of the mercury sulphates, which is in any case formed by the reaction of mercuric oxide and sulphuric acid. It will be readily appreciated that the continuity of the process does not depend on every detail of the specific reaction conditions, that is to say, the strength and identity of the catalyst are immaterial but the use of an excess of acetylene, the maintenance of the catalyst in active condition and the maintenance of a temperature at which the formed aldehyde will readily pass off with the excess acetylene are material. Thus the conditions of a continuous process are essential to the efficiency of the particular reaction disclosed but the specific conditions of the reaction are not essential to the continuity of the process.

Having thus described my invention, what I claim is;—

1. A process for the manufacture of acetaldehyde, which comprises passing acetylene through an acid solution of not greater than 6% concentration containing an oxide of mercury, and maintaining a temperature below 66° C. and a pressure below 2 lbs. per sq. in. superatmospheric.

2. A process for the manufacture of acetaldehyde, which comprises passing aectylene gas in excess of the combinable amount through an acid solution containing not more than 6% acid and containing an oxide of mercury, the reaction being carried out at a temperature between 60° and 66° C. and at a pressure below 2 lbs. per sq. in. superatmospheric.

3. A continuous process for the manufacture of acetaldehyde, which comprises continuously passing acetylene gas greatly in excess of the combinable amount through an aqueous solution of sulphuric acid containing a catalyst, and maintaining a temperature at which formed acetaldehyde distills off and is entrained by escaping acetylene, and adding water, acid and catalyst to maintain the volume and properties of the reaction liquor.

4. A continuous process for the manufacture of acetaldehyde, which comprises passing acetylene gas in excess of the combinable amount, with provision for escape of the excess, through an aqueous mineral acid solution to which has been added an oxide of mercury, and maintaining a temperature at which the acetaldehyde is vaporous and is entrained by the excess acetylene and adding water, acid and oxide to maintain the properties of the reaction liquor.

5. A continuous process for the manufacture of acetaldehyde, which comprises bringing together water and acetylene gas in excess of the combinable amount in presence of a catalyst, and with provision for escape of excess acetylene, adding water and catalyst as necessary to maintain the efficiency of the reaction, and maintaining a temperature at which the formed acetaldehyde is vaporous and is entrained by escaping excess acetylene.

In witness whereof, I have hereunto set my hand.

HOWARD W. MATHESON.